US012764711B2

(12) United States Patent
Li et al.

(10) Patent No.: US 12,764,711 B2
(45) Date of Patent: Oct. 13, 2026

(54) POSITIONING METHOD, APPARATUS, DEVICE AND SYSTEM, AND STORAGE MEDIUM

(71) Applicant: PURPLE MOUNTAIN LABORATORIES, Nanjing (CN)

(72) Inventors: Xiaodong Li, Nanjing (CN); Wangdong Qi, Nanjing (CN)

(73) Assignee: PURPLE MOUNTAIN LABORATORIES, Nanjing (CN)

( * ) Notice: Subject to any disclaimer, the term of this patent is extended or adjusted under 35 U.S.C. 154(b) by 787 days.

(21) Appl. No.: 18/034,695

(22) PCT Filed: Oct. 30, 2020

(86) PCT No.: PCT/CN2020/125174

§ 371 (c)(1),
(2) Date: Apr. 29, 2023

(87) PCT Pub. No.: WO2022/088018

PCT Pub. Date: May 5, 2022

(65) Prior Publication Data

US 2023/0403675 A1 Dec. 14, 2023

(51) Int. Cl.

*H04W 64/00* (2009.01)
*G01S 19/46* (2010.01)
*G01S 19/47* (2010.01)

(52) U.S. Cl.

CPC ........... *H04W 64/003* (2013.01); *G01S 19/46* (2013.01); *G01S 19/47* (2013.01)

(58) Field of Classification Search

CPC ...... H04W 64/003; G01S 19/46; G01S 19/47; G01S 5/02585; G01S 5/0278; G01S 19/48

See application file for complete search history.

(56) References Cited

U.S. PATENT DOCUMENTS 10,908,299 B1 * 2/2021 Tadayon ............... H04W 4/027
2011/0068979 A1 * 3/2011 Waters .................... G01S 19/26 342/357.65

(Continued)

FOREIGN PATENT DOCUMENTS

CN 106054226 A 10/2016
CN 110645979 A 1/2020

(Continued)

OTHER PUBLICATIONS

CN_110879071_B (Year: 2019).*

(Continued)

*Primary Examiner* — Nizar N Sivji
(74) *Attorney, Agent, or Firm* — The Sun IP Law

(57) ABSTRACT

Provided are a positioning method, apparatus, device and system. The method includes: a moment to be positioned at which positioning is to be performed is obtained, wherein the moment to be positioned is an IMU sampling moment of an IMU mounted on a positioning device; an IMU output value of the IMU at the moment to be positioned is obtained; when a first measurement signal from a 5G base station is received within a first predetermined time period which includes the moment to be positioned, positioning information of the positioning device is determined according to the IMU output value and the first measurement signal; and when a second measurement signal from a navigation satellite is received within a second predetermined time period which includes the moment to be positioned, positioning information of the positioning device is determined according to the IMU output value and the second measurement signal.

19 Claims, 7 Drawing Sheets

(56) References Cited

U.S. PATENT DOCUMENTS

| | | | | |
|---|---|---|---|---|
| 2015/0185018 | A1* | 7/2015 | Hesch | G01S 5/0264 701/501 |
| 2016/0219550 | A1* | 7/2016 | Palanki | H04W 64/00 |
| 2017/0251055 | A1* | 8/2017 | Edge | H04W 64/003 |
| 2018/0020329 | A1* | 1/2018 | Smith | H04W 4/08 |
| 2019/0172008 | A1* | 6/2019 | Hage | G01R 33/0206 |
| 2020/0025942 | A1* | 1/2020 | Kassas | G01C 21/165 |
| 2021/0333411 | A1* | 10/2021 | Gum | G01S 19/21 |
| 2021/0400621 | A1* | 12/2021 | Shreevastav | H04W 64/003 |
| 2022/0138896 | A1* | 5/2022 | Hou | G01S 19/45 382/100 |
| 2023/0224738 | A1* | 7/2023 | Yerramalli | H04W 64/006 370/252 |

FOREIGN PATENT DOCUMENTS

| | | | |
|---|---|---|---|
| CN | 110879071 | A | 3/2020 |
| WO | 2018217084 | A | 11/2018 |

OTHER PUBLICATIONS

Research on the Real-time Information Fusion Algorithm for GNSS/MIMU Integrated Navigation System—2014 (Year: 2014).*

Fraunhofer IIS. "Movement model based IMU positioning", 3GPP TSG RAN WG2 Meeting #101 R2-1802312, Mar. 2, 2018 (Mar. 2, 2018), Entire document.

"Review of development status of indoor location technology in China", Yan Dayu, Song Wei, Wang Xudan, et al., Journal of Navigation and Positioning, 2019, 7(4): 5-12.

* cited by examiner

POSITIONING METHOD, APPARATUS, DEVICE AND SYSTEM, AND STORAGE MEDIUM

TECHNICAL FIELD

The present disclosure relates to the technical field of positioning, in particular, to a positioning method, apparatus, device and system, and a storage medium.

BACKGROUND

Positioning technologies are widely used in various devices (such as a mobile phone, a tablet computer, and a vehicle, and the like) whose positions and poses need to be estimated.

Positioning technologies include the technology of satellite navigation positioning, the technology of Ultra Wide Band (UWB) positioning, and the like. The technology of satellite navigation positioning has high positioning accuracy in open areas such as outdoor areas, but has low positioning accuracy in indoor areas due to insufficient signals. The technology of UWB positioning can achieve high-accuracy positioning in indoor areas, but has a low positioning capability in outdoor areas.

Different positioning technologies may be combined for positioning to improve the positioning accuracy. For example, the technology of UWB positioning is used for positioning in indoor areas. The technology of satellite navigation positioning is used in outdoor open areas. However, the two technologies achieve positioning in local spaces of the indoor or outdoor areas, and are poor in connection in indoor and outdoor areas. When a device to be positioned is transferred from an indoor area to an outdoor area or from an outdoor area to an indoor area, a relatively large positioning error will occur, and continuous high-accuracy positioning in the space cannot be achieved.

Therefore, the above positioning technologies still need to be improved.

SUMMARY

Based on this, it is necessary to provide a positioning method, apparatus, device and system, and a storage medium.

In one aspect, a positioning method is provided, including: obtaining a moment to be positioned at which positioning is to be performed; obtaining an Inertial Measurement Unit (IMU) output value of an IMU mounted on a positioning device at the moment to be positioned; when a first measurement signal from a 5G base station is received within a first predetermined time period which includes the moment to be positioned, determining positioning information of the positioning device according to the IMU output value and the first measurement signal; and when a second measurement signal from a navigation satellite is received within a second predetermined time period which includes the moment to be positioned, determining positioning information of the positioning device according to the IMU output value and the second measurement signal.

In another aspect, a positioning apparatus is provided, including: a moment obtaining component, configured to obtain a moment to be positioned at which positioning is to be performed; an IMU value obtaining component, configured to obtain an IMU output value of an IMU mounted on a positioning device at the moment to be positioned; a first positioning component, configured to: when a first measurement signal from a 5G base station is received within a first predetermined time period which includes the moment to be positioned, determine positioning information of the positioning device according to the IMU output value and the first measurement signal; and a second positioning component, configured to: when a second measurement signal from a navigation satellite is received within a second predetermined time period which includes the moment to be positioned, determine positioning information of the positioning device according to the IMU output value and the second measurement signal.

In another aspect, a positioning device is provided, including an IMU component, a 5G component, a satellite positioning component, a memory and a processor; the IMU component, the 5G component, the satellite positioning component and the memory are respectively connected to the processor; the IMU component is configured to obtain an IMU output value of the positioning device at an IMU sampling moment, and output the IMU output value to the processor; the 5G component is configured to receive, from a 5G base station, a first measurement signal of an uplink reference signal of the positioning device measured by the 5G base station at a 5G sampling moment, and output the first measurement signal to the processor; the satellite positioning component is configured to receive, from a navigation satellite, a second measurement signal of the positioning device observed by the navigation satellite at a satellite sampling moment, and output the second measurement signal to the processor; the memory is configured to store a computer program; and the processor is configured to, when executing the computer program, implement the following method: obtaining a moment to be positioned at which positioning is to be performed; obtaining an IMU output value of an IMU mounted on the positioning device at the moment to be positioned; when a first measurement signal from a 5G base station is received within a first predetermined time period which includes the moment to be positioned, determining positioning information of the positioning device according to the IMU output value and the first measurement signal; and when a second measurement signal from a navigation satellite is received within a second predetermined time period which includes the moment to be positioned, determining positioning information of the positioning device according to the IMU output value and the second measurement signal.

In another aspect, a positioning system is provided, including a 5G base station, a navigation satellite and a positioning device; the positioning device is in communication connection with the navigation satellite and the 5G base station respectively; the 5G base station is configured to measure a first measurement signal of an uplink reference signal of the positioning device at a 5G sampling moment, and output the first measurement signal to the positioning device; the navigation satellite is configured to observe a second measurement signal of the positioning device at a satellite sampling moment, and output the second measurement signal to the positioning device; and the positioning device is configured to perform the following method: obtaining a moment to be positioned at which positioning is to be performed; obtaining an IMU output value of an IMU mounted on the positioning device at the moment to be positioned; when a first measurement signal from a 5G base station is received within a first predetermined time period which includes the moment to be positioned, determining positioning information of the positioning device according to the IMU output value and the first measurement signal; and when a second measurement signal from a navigation satellite is received within a second predetermined time period which includes the moment to be positioned, determining positioning information of the positioning device according to the IMU output value and the second measurement signal.

In one aspect, a computer-readable storage medium is provided, which stores a computer program. The computer program, when executed by a processor, implements the following method: obtaining a moment to be positioned at which positioning is to be performed; obtaining an IMU output value of an IMU mounted on the positioning device at the moment to be positioned; when a first measurement signal from a 5G base station is received within a first predetermined time period which includes the moment to be positioned, determining positioning information of the positioning device according to the IMU output value and the first measurement signal; and when a second measurement signal from a navigation satellite is received within a second predetermined time period which includes the moment to be positioned, determining positioning information of the positioning device according to the IMU output value and the second measurement signal.

Details of one or more embodiments of the present disclosure will be proposed in the following accompanying drawings and descriptions. Other features, objectives and advantages of the present disclosure will become apparent from the specification, the accompany drawings and the claims.

BRIEF DESCRIPTION OF THE DRAWINGS

To describe the technical solutions in the embodiments of the present disclosure more clearly, accompanying drawings required to be used in the embodiments will be briefly introduced below.

Apparently, the drawings in the descriptions below are only some embodiments of the present disclosure. Those of ordinary skill in the art also can obtain other drawings according to these drawings without creative work.

DETAILED DESCRIPTION OF THE EMBODIMENTS

In order to make the objectives, technical solutions and advantages of the present disclosure clearer, the present disclosure is further described below in detail with reference to accompanying drawings and embodiments. It should be understood that the specific embodiments described here are merely to explain the present disclosure, and not intended to limit the present disclosure.

Figure 1:
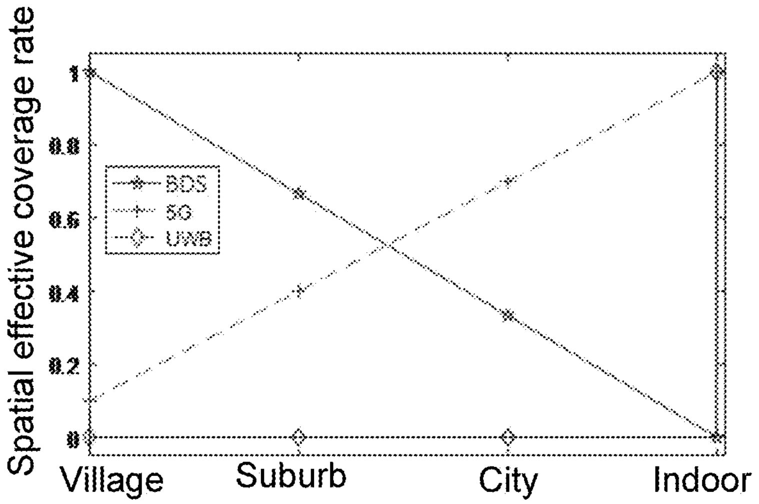
FIG. 1 is a schematic diagram of spatial effective coverage rates of BDS, 5G and UWB positioning technologies in one embodiment of the present disclosure.
Figure 2:
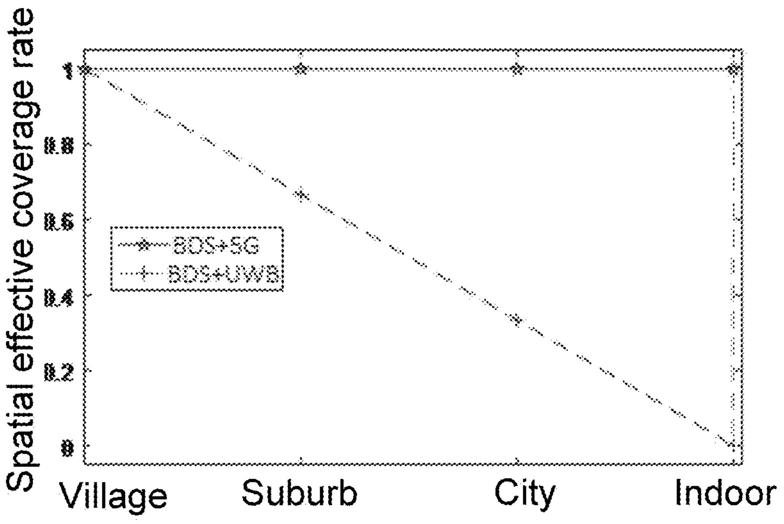
FIG. 2 is a schematic diagram of a spatial effective coverage rate of a BDS+5G combined positioning technology and a spatial effective coverage rate of a BDS+UWB combined positioning technology in one embodiment of the present disclosure.

In order to achieve continuous high-accuracy positioning in space, a space can be divided according to the characteristics and limitations of positioning methods, namely, from villages to cities, and from outdoor to indoor. As shown in FIG. 1, a spatial effective coverage rate refers to a proportion of a spatial area in which high-accuracy positioning can be achieved. A satellite navigation system, taking a BeiDou Navigation Satellite System (BDS) as an example, may perform high-accuracy positioning in outdoor open areas, including rural and suburban areas. Due to numerous high-rise buildings in the city, on the one hand, satellite signals may be shielded, and on the other hand, the multipath effect is serious, so the positioning accuracy and spatial effective coverage of the BDS technology are greatly reduced. In addition, UWB positioning may perform indoor high-accuracy positioning. According to FIG. 1, there is no strong complementarity between the positioning space of the BDS positioning and the positioning space of the UWB positioning. Therefore, as shown in FIG. 2, by combining the BDS positioning and the UWB positioning, the spatial continuity and effectiveness of positioning cannot be achieved. That is, temporal-spatial universal high-accuracy positioning cannot be achieved.

The technology of 5th-Generation (5G) mobile communication technology-based positioning is a new emerging positioning technology, which can achieve decimeter or even centimeter-level positioning accuracy when 5G base stations are densely deployed. Compared with UWB positioning, the technology of 5G positioning does not require additional labor and equipment costs. More importantly, the spatial effective coverage range of 5G positioning is much greater than that of the UWB positioning, and a strong spatial complementarity is formed with the BDS positioning. As can be seen from FIG. 1, from villages to indoor areas, the spatial effective coverage rate of the BDS gradually decreases, while the spatial effective coverage rate of 5G positioning gradually increases. The BDS positioning and the 5G positioning are highly complementary in space, so deep fusion of the BDS positioning and the 5G positioning can achieve continuity of spatial positioning. As shown in FIG. 2, from villages to suburban areas, BDS positioning is mainly used firstly, and 5G positioning is supplemented for replacing the BDS positioning; and from urban areas to indoor areas, 5G positioning is mainly used firstly, and BDS positioning is supplemented for replacing the BDS positioning. In addition, because buildings, vehicles, trees and the like may shield signals, it is difficult to achieve continuous high-accuracy positioning in time with BDS+5G. Therefore, in the present disclosure, an IMU is further combined to achieve continuous high-accuracy positioning in time. That is, BDS+5G and the IMU are complementary in time.

Therefore, in positioning methods provided in the following embodiments of the present disclosure, a satellite navigation system, 5G positioning, and an IMU are deeply fused to achieve advantage complementation, thereby effectively improving the continuity and effectiveness of positioning in time and space, that is, achieving temporal-spatial universal high-accuracy positioning.

Figure 3:
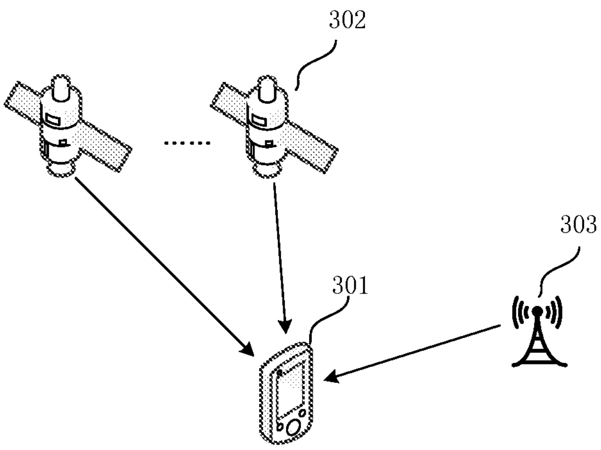
FIG. 3 is a schematic diagram of an application environment in one embodiment of the present disclosure.

The positioning method provided in the present disclosure may be applied to an application environment shown in FIG. 3. The application environment includes a positioning device 301, a satellite navigation system 302, and a 5G base station 303. The positioning device 301 is in communication connection to the satellite navigation system 302 and the 5G base station 303, respectively. The satellite navigation system 302 may include multiple satellites. The positioning device 301 may be configured with a satellite positioning component, a 5G component, and an IMU. The satellite positioning component may include a receiver. The positioning device 301 may receive a second measurement signal of one or more satellites in the satellite navigation system 302 through the receiver, and the positioning device 302 may also receive a first measurement signal of the 5G base station 303 through the 5G component. In addition, the positioning device 301 may also read IMU output values output from the IMU, such as a position, speed and pose of the positioning device 301. The positioning device 301 performs the positioning method of any embodiment of the present disclosure to determine positioning information such as the position, speed, and pose of the positioning device 301 itself, and to achieve accurate positioning itself.

Figure 4:
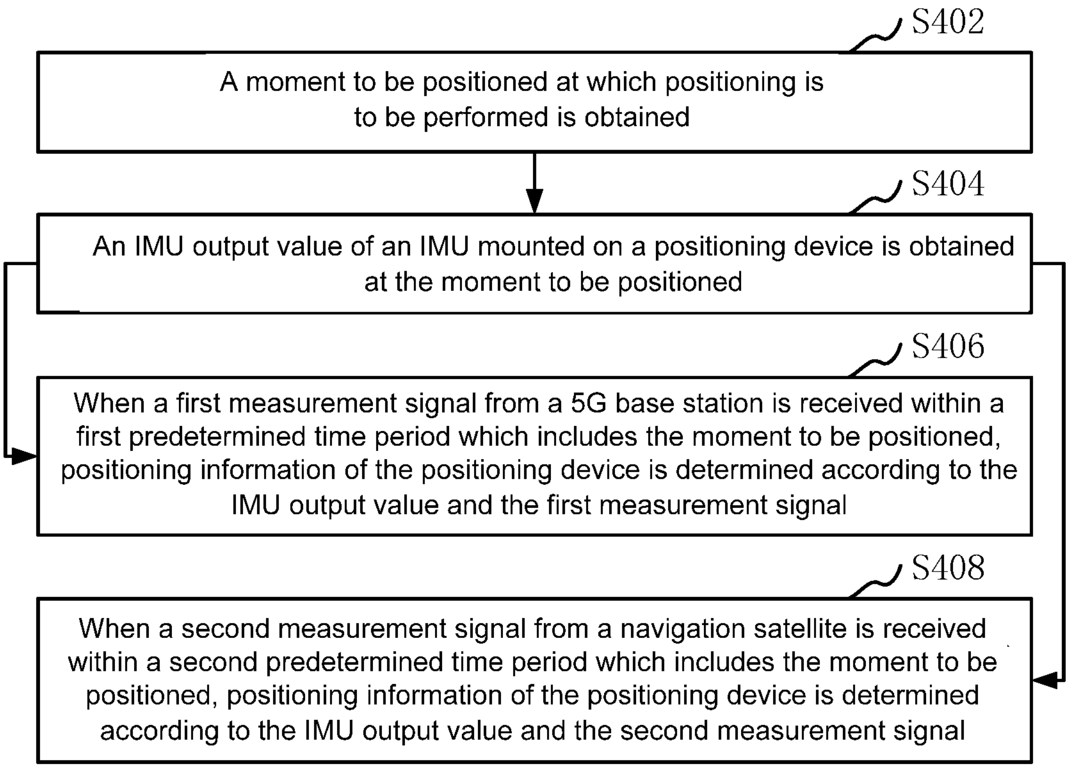
FIG. 4 is a flow chart of a positioning method in one embodiment of the present disclosure.
Figure 5:
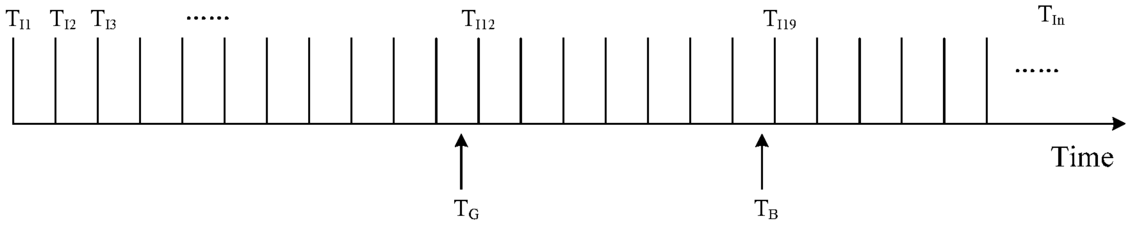
FIG. 5 is a schematic diagram of a time stream of a positioning method in one embodiment of the present disclosure.

In one embodiment, referring to FIG. 4 and FIG. 5, a positioning method is provided. Applying the positioning method to the positioning device 301 as shown in FIG. 3 is taken for example. The method may include:

In Step S402, a moment to be positioned at which positioning is to be performed is obtained.

The moment to be positioned at which positioning is to be performed refers to a moment at which positioning information of a positioning device needs to be determined. The moment to be positioned may be set according to a positioning requirement of the positioning device. In this step, the positioning device determines the moment to be positioned.

In Step S404, an IMU output value of an IMU mounted on the positioning device at the moment to be positioned is obtained.

The positioning device refers to a device to be positioned. The positioning device may be a device that performs the positioning method of the present disclosure, so that the positioning device may determine its own positioning information by performing the positioning method of the present disclosure.

The IMU is mounted on the positioning device. The IMU may include sensors such as an accelerometer and a gyroscope. FIG. 5 shows a schematic diagram of a positioning method in an embodiment of the present disclosure. TI1, TI2, TI3, . . . , and TIn represent sampling moments of IMU data, and the IMU data at the sampling moments output by the IMU may be a data chain. The IMU may output the mechanizationed IMU output values at each IMU sampling moment $T_{In}$. The IMU output values may include original data directly measured by the IMU and/or data calculated according to these original data. For example, the IMU output values may include an acceleration, position, speed, and pose (the pose includes a heading angle, a pitching angle and a roll angle) of a carrier (which may be the positioning device herein) which carries the IMU. A position output by the IMU may be calculated according to an initial position (existing) of the IMU or a position at a previous moment, and according to the original data measured at a current moment.

In Step S406, when a first measurement signal from a 5G base station is received within a first predetermined time period which includes the moment to be positioned, positioning information of the positioning device is determined according to the IMU output value and the first measurement signal.

The first predetermined time period which includes the moment to be positioned may be determined according to actual conditions, such as according to the number of first measurement signals needing to be received. In this step, one or more first measurement signals may be received within the first predetermined time period. Respectively receiving three continuous first measurement signals at three continuous 5G sampling moments within the first predetermined time period is taken as an example. In this embodiment, a maximum possible time interval may be taken as the first predetermined time period, wherein the maximum possible time interval comprises one closest 5G measurement moment after the moment to be positioned and two 5G measurement moments before the closest 5G measurement moment. For example, if an IMU sampling interval is sampling once every 1 ms, a 5G sampling interval is sampling once every 9 ms, and the moment to be positioned is the 35th ms, the first predetermined time period may be set to (8 ms, 44 ms).

The first measurement signal of the 5G base station is a signal obtained by observing the positioning device by the 5G base station and used for positioning the positioning device. The 5G base station observes the positioning device within its observation range at the 5G sampling interval to obtain the first measurement signal and sends same to the positioning device.

The positioning information is information that represents a positioning result of the positioning device, and the positioning information may include, for example, a position, speed and pose of the positioning device.

In this step, if the positioning device receives the first measurement signal from the 5G base station at all the sampling moments within the first predetermined time period which includes the moment to be positioned, it indicates that the quality of the current first measurement signal from the 5G base station is good. Therefore, the first measurement signal may be combined with the IMU output value to accurately obtain the positioning information at the moment to be positioned. As shown in FIG. 5, for example, if the first measurement signal or estimated value of the 5G base station is transmitted to the positioning device at a moment $T_B$, the first measurement signal and the IMU output value are used to position the positioning device.

In Step S408, when a second measurement signal from a navigation satellite is received within a second predetermined time period which includes the moment to be positioned, positioning information of the positioning device is determined according to the IMU output value and the second measurement signal.

The method for setting the second predetermined time period which includes the moment to be positioned at step S408 may be similar with the method for setting the first predetermined time period which includes the moment to be positioned at step S406. The second predetermined time period may be the same or different from the first predetermined time period. For example, the second predetermined time period may be determined according to the number of second measurement signals needing to be received within the second predetermined time period. Specific details will not be repeated here.

The navigation satellite refers to one or more navigation satellites in a navigation satellite system. The navigation satellite system may, for example, be a Global Navigation Satellite System (GNSS). For example, the navigation satellite system may include a BDS, a Global Positioning System (GPS), a Galileo Navigation Satellite System (Galileo) and/or a Global Orbiting Navigation Satellite System (GLONASS).

The second measurement signal of the navigation satellite is a signal obtained by observing the positioning device by the navigation satellite and used for positioning the positioning device. The navigation satellite observes the positioning device at the satellite sampling moment to obtain the second measurement signal and sends same to the positioning device.

In this step, if the positioning device receives the second measurement signal from the navigation satellite at all the sampling moments within the second predetermined time period which includes the moment to be positioned, it indicates that the quality of the current second measurement signal from the navigation satellite is good. Therefore, the second measurement signal may be combined with the IMU output value to accurately obtain the positioning information at the moment to be positioned. As shown in FIG. 5, for example, if the second measurement signal of the navigation satellite is issued to the positioning device at a moment TG, the second measurement signal and the IMU output value are used to position the positioning device.

According to the above positioning method, the 5G and IMU tightly coupled positioning, as well as the satellite navigation system and IMU tightly coupled positioning is applied. When the first measurement signal from the 5G base station is received within the first predetermined time period which includes the moment to be positioned, the first measurement signal and the IMU output value are combined to determine the positioning information of the positioning device. At the same time, when the second measurement signal from the navigation satellite is received within in the second predetermined time period which includes the moment to be positioned, the second measurement signal and the IMU output value are combined to determine the positioning information of the positioning device. Since 5G positioning and satellite positioning are highly complementary in indoor and outdoor environments, the positioning method for deeply fusing the satellite navigation system, the 5G and the IMU in the present disclosure can effectively improve the continuity and effectiveness of positioning in time and space.

The 5G and IMU tightly coupled positioning method involved in step S406 will be described in detail below.

Since the sampling moments of the 5G base station and the sampling moments of the IMU are often different, there is usually a time difference between the 5G sampling moment of the first measurement signal obtained in step S406 and the IMU sampling moment of the IMU output value. Therefore, it is necessary to solve the problem of high-accuracy time alignment between the two moments. That is, it is necessary to estimate output values of the 5G base station and the IMU at the same moment for positioning.

Figure 6:
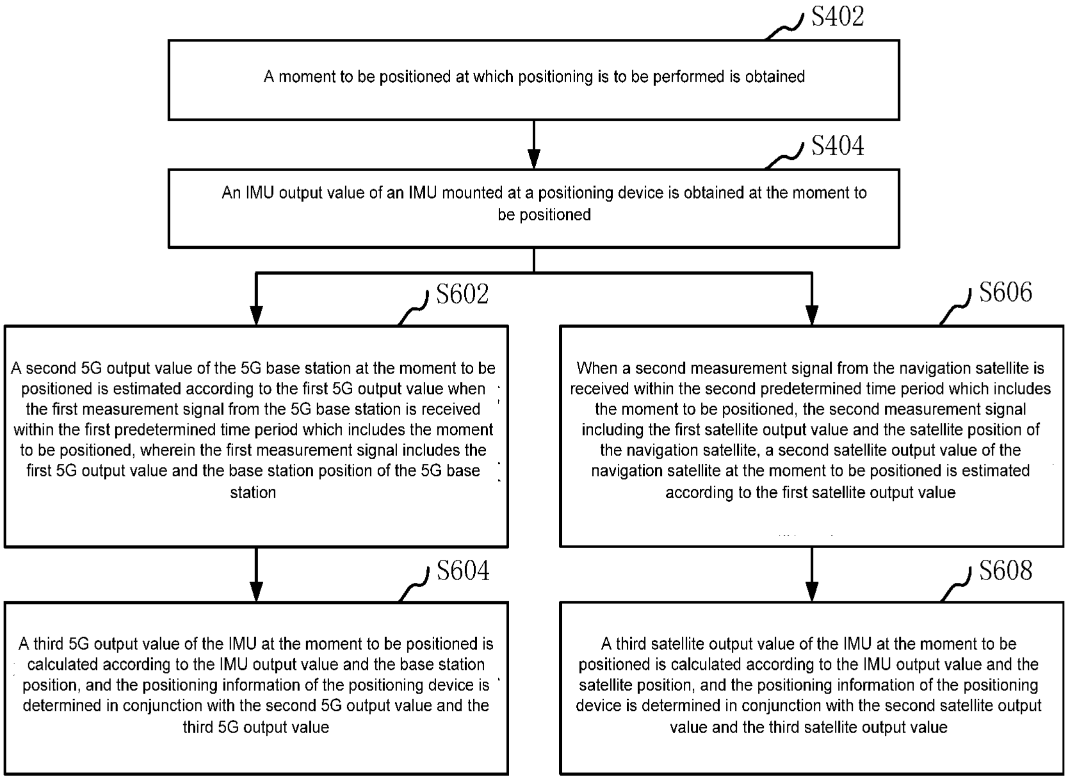
FIG. 6 is a flow chart of a positioning method in one embodiment of the present disclosure.
Figure 7:
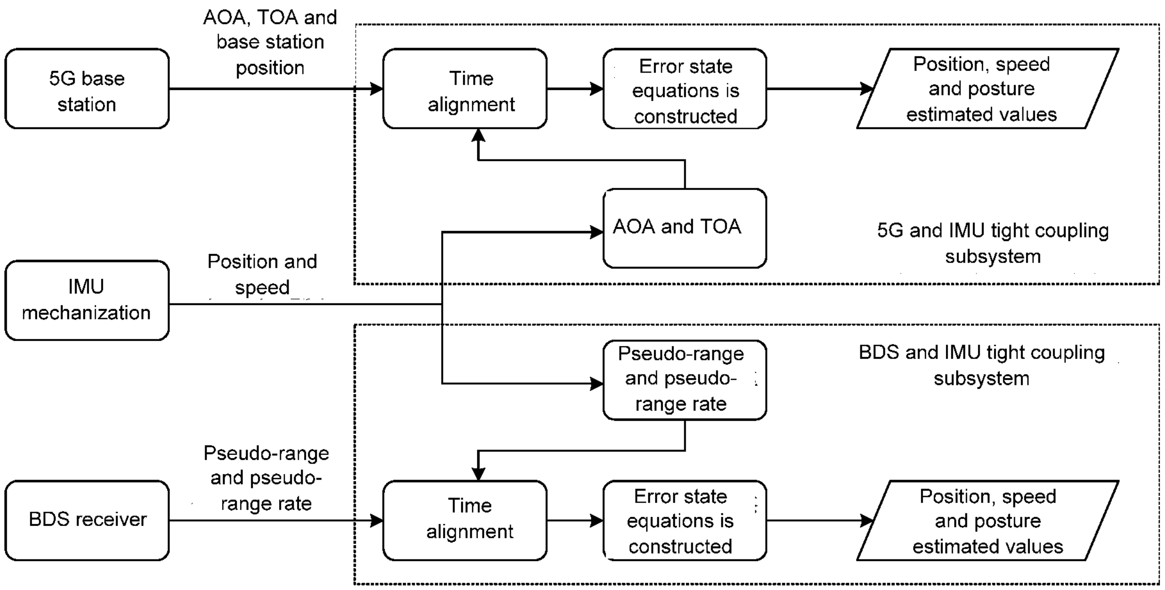
FIG. 7 is a schematic diagram of a positioning method in one embodiment of the present disclosure.

In one embodiment, as shown in FIG. 6 and FIG. 7, the moment to be positioned in step S402 is the IMU sampling moment of the IMU mounted on the positioning device. The first measurement signal in step S406 may include a first 5G output value and a base station position of the 5G base station. In Step S406, when the first measurement signal from the 5G base station is received within a first predetermined time period which includes the moment to be positioned, positioning information of the positioning device is determined according to the IMU output value and the first measurement signal, may include:

In Step S602, a second 5G output value of the 5G base station at the moment to be positioned is estimated according to the first 5G output value when the first measurement signal from the 5G base station is received within the first predetermined time period which includes the moment to be positioned, wherein the first measurement signal includes the first 5G output value and the base station position of the 5G base station; and In Step S604, a third 5G output value of the IMU at the moment to be positioned is calculated according to the IMU output value and the base station position, and the positioning information of the positioning device is determined in conjunction with the second 5G output value and the third 5G output value.

In this embodiment, the moment to be positioned is set to the IMU sampling moment. As at the IMU sampling moment, the second 5G output value of the 5G base station at the moment to be positioned is estimated. The third 5G output value of the IMU at the moment to be positioned is calculated according to the IMU output value and the base station position. Therefore, it can be able to conveniently and quickly determine the third 5G output value of the IMU and the second 5G output value of the 5G base station, as to facilitate subsequent positioning calculation based on data of the IMU and the 5G base station, wherein the third 5G output value of the IMU and the second 5G output value of the 5G base station correspond to the same moment and have the same form.

The first 5G output value, the second 5G output value, and the third 5G output value in above step S602 and step S604 refer to data with the same form of the data which is output by the 5G base station and used for positioning. In one embodiment, each of the first 5G output value, the second 5G output value and the third 5G output value may include an Angle of Arrival (AoA) and Time of Arrival (TOA).

Figure 8:
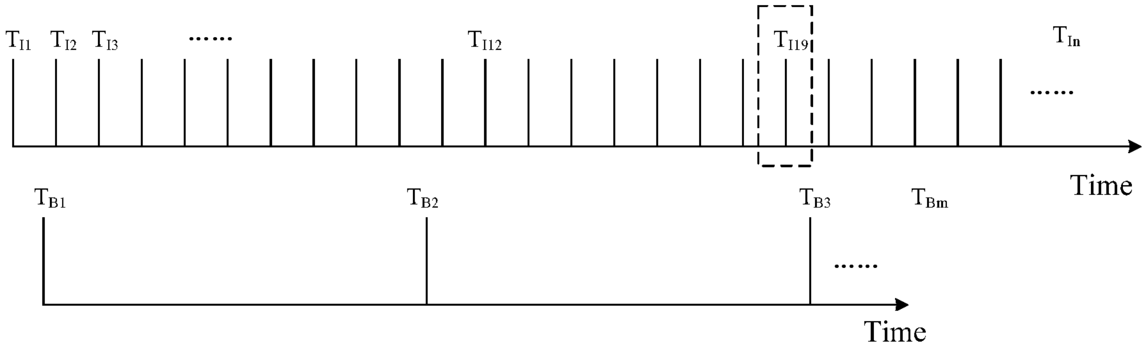
FIG. 8 is a schematic diagram of a time stream of a 5G and IMU time alignment method in one embodiment of the present disclosure.

As shown in FIG. 8, $T_{In}$ represents a mechanizationed $n^{th}$ IMU sampling moment at which the IMU outputs. Correspondingly, the third 5G output value of the IMU at the moment to be positioned may be expressed as:

$$U_{In} = [\, r_I^1 \;\; \theta_I^1 \;\; \varphi_I^1 \,],$$

where $$r_I^1,\ \theta_I^1 \text{ and } \varphi_I^1$$

are respectively values of a radial distance, an azimuth angle and an elevation angle of the positioning device carrying the IMU, wherein the values are in a local level coordinate system of the 5G base station. $TB_n$ represents the 5G sampling moment at which the 5G base station outputs a measured value or an estimated value. The corresponding first 5G output value is expressed by $$B_{In}=[\,r_B^I\;\;\theta_B^I\;\;\varphi_B^I\,],$$

where $$r_B^I,\ \theta_B^I \text{ and } \varphi_B^I$$

are respectively values of a radial distance, an azimuth angle and an elevation angle of the positioning device carrying the 5G component. The values are in the local level coordinate system of the 5G base station, where $$\theta_B^I \text{ and } \varphi_B^I$$

are AOA information obtained by the 5G base station, $$r_B^I/c$$

is TOA information obtained by the 5G base station, and c represents a light speed. When a third output value $B_{I3}$ of the 5G base station is issued to the positioning device, the third output value $B_{I3}$ being within the first predetermined time period around a moment $T_{I19}$ (that is, the moment in a dashed box in FIG. 3) at which positioning is to be performed, the second 5G output value of the 5G base station at the moment $T_{I19}$ needs to be estimated, to subsequently perform fusion calculation on the third 5G output value of the IMU and the second 5G output value of the 5G base station at the moment $T_{I19}$.

In one embodiment, the above first 5G output value may include: M first 5G output values of uplink reference signals of the positioning device measured by the 5G base station at M 5G sampling moments of the 5G base station within the first predetermined time period, and M is a positive integer.

The value of M may be determined according to an actual need. In this embodiment of the present disclosure, M may be greater than or equal to 2. For example, M may be 3. In other embodiments, M may be a larger or smaller value.

According to different values of M, different methods may be used to estimate the second 5G output value of the 5G base station at the moment to be positioned. For example, when M=1, that is, when there is only one first 5G output value, an extrapolation method may be used to estimate the corresponding second 5G output value. The extrapolation method may be any of the existing extrapolation estimation methods.

In one embodiment, when M≥2, a time alignment method between the 5G and the IMU involved in step S602, that is, the step that the second 5G output value of the 5G base station at the moment to be positioned is estimated according to the first 5G output value, may include: by using an interpolation method, the second 5G output value of the 5G base station at the moment to be positioned is estimated according to the M 5G sampling moments, the M first 5G output values and the moment to be positioned.

According to different values of M, different interpolation methods may be used to estimate the second 5G output value. For example, when M=2, any existing interpolation method may be used to estimate the corresponding second 5G output value. When M=3, for example, a Lagrange three-point interpolation method may be used to estimate the corresponding second 5G output value.

M=3 is taken as an example. As shown in FIG. 8, a second 5G output value of the 5G base station at a moment $T_{I19}$ may be estimated by the following formula of the Lagrange three-point interpolation method according to three continuous first 5G output values $B_{I1}$, $B_{I2}$ and $B_{I3}$, wherein the three continuous first 5G output values $B_{I1}$, $B_{I2}$ and $B_{I3}$ are issued to the positioning device within the first predetermined time period around the moment $T_{I19}$:

$$B_{19}=\frac{(T_{I19}-T_{B2})\times(T_{I19}-T_{B3})}{(T_{B1}-T_{B2})\times(T_{B1}-T_{B3})}\times B_{I1}+\frac{(T_{I19}-T_{B1})\times(T_{I19}-T_{B3})}{(T_{B2}-T_{B1})\times(T_{B2}-T_{B3})}\times B_{I2}+\frac{(T_{I19}-T_{B1})\times(T_{I19}-T_{B2})}{(T_{B3}-T_{B1})\times(T_{B3}-T_{B2})}\times B_{I3} \quad (1)$$

In this embodiment, by means of the interpolation method, the second 5G output value of the moment may be estimated according to the first 5G output values of a plurality of existing moments around the moment to be positioned.

Further, in addition to using the interpolation method to estimate the second 5G output value, a neural network may be further combined to estimate the second 5G output value.

Figure 9:
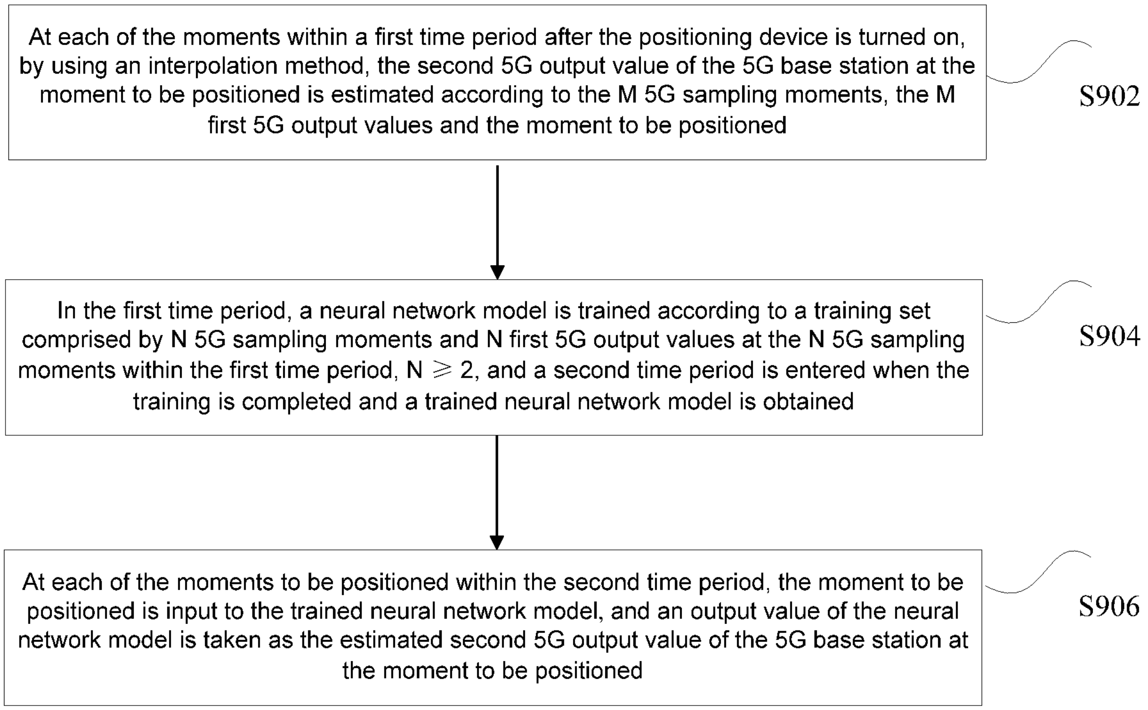
FIG. 9 is a flow chart of a step of estimating a second 5G output value in one embodiment of the present disclosure.

In another embodiment, as shown in FIG. 9, step S602, in which a second 5G output value of the 5G base station at the moment to be positioned is estimated according to the first 5G output value, may also include:

In Step S902, at each of the moments to be positioned within a first time period after the positioning device is turned on, the second 5G output value of the 5G base station at the moment to be positioned is estimated by using an interpolation method, according to the M 5G sampling moments, the M first 5G output values and the moment to be positioned.

Similarly, M=3 is taken as an example. At the beginning when the positioning device performs the positioning method, namely, within the first time period ($T_{I1}$-$T_{INc}$) after the positioning device is turned on, the second 5G output value of the 5G base station at the moment to be positioned may be estimated by using the Lagrange three-point interpolation method. As an example in FIG. 3, the second 5G output value at the moment $T_{I19}$ to be positioned may also be calculated by using formula (1), wherein the moment $T_{I19}$ to be positioned is within the period $T_{I1}$~$T_{IN_c}$.

In Step S904, in the first time period, a neural network model is trained according to a training set comprised by N 5G sampling moments within the first time period and N first 5G output values at the N 5G sampling moments, N≥2, and a second time period starts when the training is completed and a trained neural network model is obtained.

When step S902 of estimating the second 5G output value using the interpolation method is performed, in this step S904, within the first time period, that is, period $T_{I1}$-$T_{INc}$, a high-accuracy time alignment method based on a neural network is also running.

The following is taken as an example: the neural network uses a Long Short Term Memory Neural Network (LSTMNN), and M is equal to 3. At period $T_{I1}$-$T_{INc}$, three adjacent 5G sampling moments may be obtained in real time and the two first 5G output values of the first and last 5G sampling moments in the three adjacent 5G sampling moments are taken as input values of the LSTMNN. The first 5G output value corresponding to the middle 5G sampling moment among the three adjacent 5G sampling moments is taken as an output value of the corresponding LSTMNN, so that a plurality of pairs of input-output values are formed to be a training set. The training set is configured to train the LSTMNN in real time. The number of input-output value pairs may be determined according to actual situations. For example, 50 pairs input-output value pairs may be obtained, or more or fewer than 50 pairs input-output value pairs also may be obtained. Correspondingly, the value of N may be set according to the number of input-output value pairs. Obtaining 50 pairs of input-output value is taken as an example. Correspondingly, N may be 52, that is, 52 first 5G output values of 52 continuous 5G sampling moments are obtained. Every three adjacent 5G sampling moments and the corresponding three first 5G output values form one input-output value pair as above. Correspondingly, in the LSTMNN training phase, an input vector at a moment k is $[T_{Bk-1}, B_{Ik-1}, T_{Bk+1}, B_{Ik+1}, T_{Bk}]^T$, and an output is $B_{Ik}$.

The LSTMNN is trained using an online training mode, and a training algorithm is an Unscented Kalman Filter (UKF)-based training method. At the moment $T_{IN_c}$, the LSTMNN has converged, that is, a trained neural network model may be obtained, and the second time period is started.

In Step S906, at each of the moments to be positioned within the second time period, the moment to be positioned is input to the trained neural network model and an output value of the neural network model is used as the estimated second 5G output value of the 5G base station at the moment to be positioned.

The LSTMNN is also taken as an example. In this step, within the second time period, that is, after the moment $T_{IN_c}$, the positioning device may use an LSTMNN-based high-accuracy time alignment method to perform 5G and IMU time alignment.

During the high-accuracy time alignment, an input vector $[T_{Bk-1}, B_{Ik-1}, T_{Bk+1}, B_{Ik+1}, T_{I\alpha}]^T$ at any moment $\alpha$ may be input to the LSTMNN to obtain an output value $B_{I\alpha}$, where $T_{Bk-1} \le T_{I\alpha} \le T_{Bk+1}$, and the output value $B_{I\alpha}$ is the second 5G output value of the 5G base station at the moment to be positioned $\alpha$.

The neural network has higher estimation accuracy compared to the interpolation estimation method, but the neural network requires certain training time. In this embodiment, at the initial stage of positioning on the positioning device, the interpolation method is configured to estimate the second 5G output value at the moment to be positioned. Meanwhile, at the initial stage of positioning on the positioning device, the neural network is trained simultaneously. After the neural network converges, the neural network is configured to estimate the second 5G output value at the moment to be positioned, which can improve the accuracy of positioning time alignment while taking the overall time utilization efficiency into account.

Figure 10:
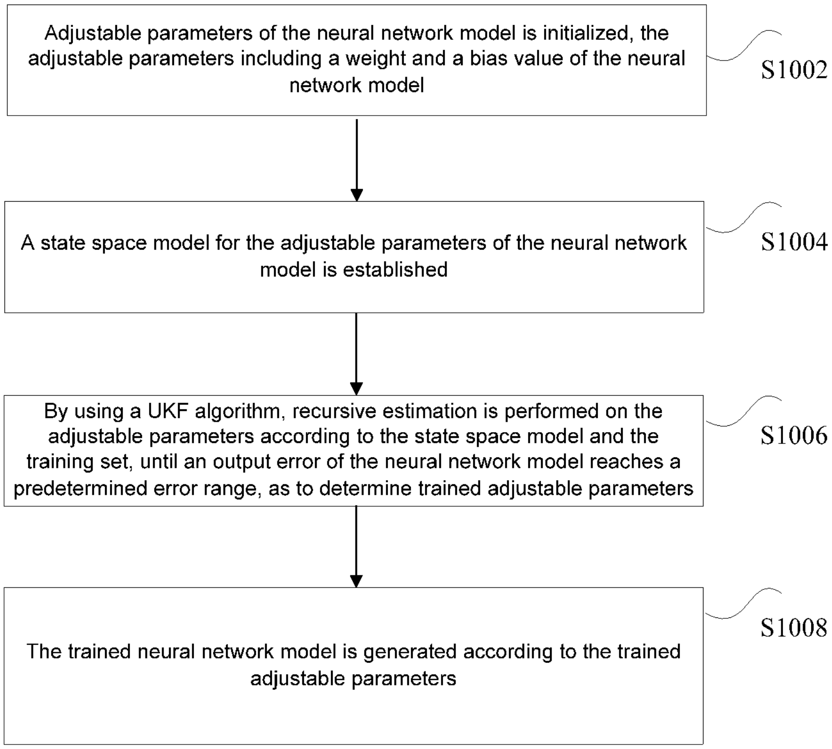
FIG. 10 is a flow chart of a step of training a neural network in one embodiment of the present disclosure.

In one embodiment, as shown in FIG. 10, step S904, in which the neural network is trained according to the training set, includes: In Step S1002, adjustable parameters of the neural network model are initialized, the adjustable parameters including a weight and a bias value of the neural network model.

The neural network model may have a set number of hidden layers and a set number of nodes in each of an input layer, a hidden layer, and an output layer. During the training of the neural network model, the adjustable parameters, including the bias values of the various layers and the weights of the various layers, of the neural network may be initialized, to preliminarily obtain an initialized neural network model.

In Step S1004, a state space model for the adjustable parameters of the neural network model is established.

The LSTMNN is taken as an example. To train the LSTMNN by using the UKF algorithm, it is necessary to first establish the state space model for the adjustable parameters of the LSTMNN. By using this state space model, the UKF algorithm may perform recursive estimation on the adjustable parameters in the LSTMNN. The state space model for the adjustable parameters of the LSTMNN is:

$$\theta(k) = \theta(k-1) + w(k-1) \qquad (2)$$

$$y(k) = h[\theta(k), u(k)] + v(k)$$

where $\theta(k)$ is a set vector of the adjustable parameters of the LSTMNN at the moment k, namely, a weight matrix and bias vector of the LSTMNN; $u(k)=[T_{Bk-}, B_{Ik-1}, T_{Bk+1}, B_{Ik+1}, T_{Bk}]^T$ and $y(k)=B_{Ik}$ are respectively an input value and an output value of the LSTMNN; h[•] represents an internal dynamic process of the LSTMNN; and w(k−1) and v(k) are state and observation noise vectors, respectively. By using the state space model shown in formula (2), the UKF algorithm may perform the recursive estimation on the adjustable parameters in the LSTMNN.

In Step S1006, by using a UKF algorithm, recursive estimation is performed on the adjustable parameters according to the state space model and the training set, until an output error of the neural network model reaches a predetermined error range, so that the trained adjustable parameters is determined.

In this step, the state space model shown in formula (2) may be used to substitute each input-output value pair in the training set into the LSTMNN for recursive estimation, until the output error of the LSTMNN reaches the predetermined error range, that is, until the LSTMNN converges. At this time, the adjustable parameters are the trained adjustable parameters.

In Step S1008, the trained neural network model is generated according to the trained adjustable parameters.

In this step, the trained neural network model is correspondingly determined by using the trained adjustable parameters.

In this embodiment, when the UKF method is used to train the neural network, and second-order derivative information may be used, the convergence is fast, and it is not easy to obtain local minima. Therefore, the time alignment accuracy of the ultimately trained neural network model, namely, the accuracy of the estimated second 5G output value, is high.

The neural network of the present disclosure has been described above by using the LSTMNN as an example. As a recursive neural network, applying the LSTMNN to the time alignment method provided in the present disclosure can effectively improve the accuracy of time alignment, but the neural network of the present disclosure is not limited to this. For example, the neural network of the present disclosure may also use a Multi-Layer Perceptron (MLP), and the UKF algorithm may also be used to train the MLP. For another example, the neural network of the present disclosure may also use a Radial Basis Function (RBF) neural network, and the like.

Figure 11:
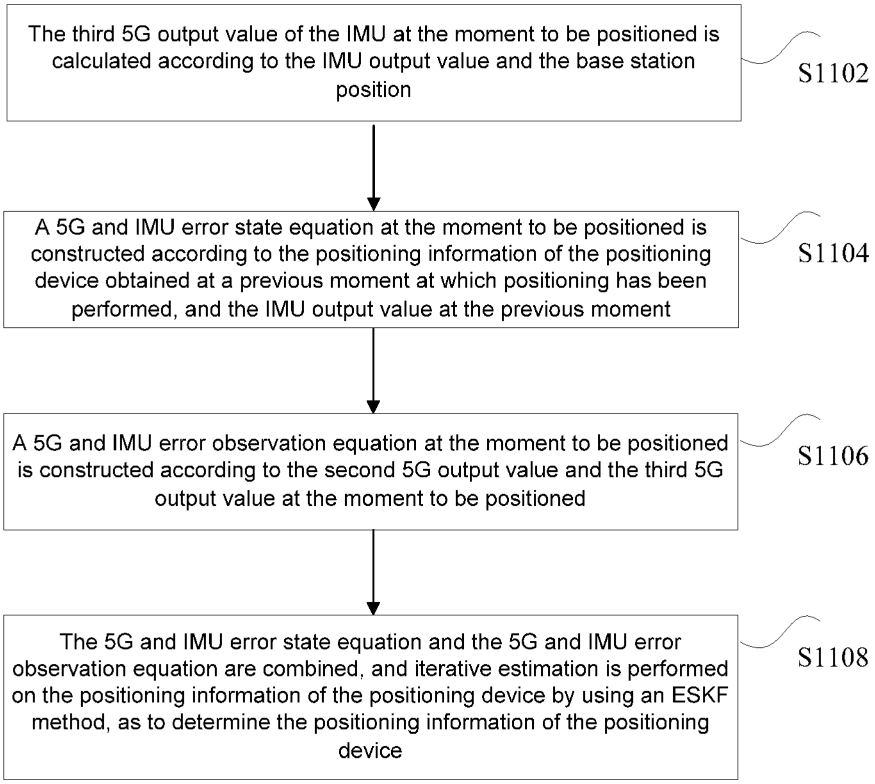
FIG. 11 is a flow chart of a step of determining positioning information of a positioning device in one embodiment of the present disclosure.

In one embodiment, as shown in FIG. 11, step S604, in which a third 5G output value of the IMU at the moment to be positioned is calculated according to the IMU output value and the base station position, and the positioning information of the positioning device is determined in conjunction with the second 5G output value and the third 5G output value, includes: In Step S1102, the third 5G output value of the IMU at the moment to be positioned is calculated according to the IMU output value and the base station position.

In the aforementioned step S404, the obtained IMU output value may include an acceleration, position, speed, and pose and so on of the positioning device. For example, the position may include a longitude, latitude, and altitude of the positioning device in a local level coordinate system; the speed may include east speed, north speed, and up speed of the positioning device in a navigation coordinate system; and the pose may include a heading angle, an elevation angle and a roll angle of the positioning device in a carrier coordinate system relative to the navigation coordinate system.

In this step, the positioning device may calculate the third 5G output value of the IMU at the moment to be positioned according to the above IMU output value and the base station position. The third 5G output value may be expressed as $$U_{In}=[\,r_I^i\ \ \theta_I^i\ \ \varphi_I^i\,].$$

In Step S1104, a 5G and IMU error state equation at the moment to be positioned is constructed according to the positioning information of the positioning device obtained at a previous moment at which positioning has been performed, and the IMU output value at the previous moment.

For example, the positioning device may construct the 5G and IMU error state equations for the current moment to be positioned as formulas (3)-(5), and the IMU uses a triaxial accelerometer and a three-axis gyroscope.

$$\dot{\phi}=M_{aa}\phi+M_4\delta v^n+M_{ap}\delta p-C_b^n\varepsilon^b \tag{3}$$

$$\delta\dot{v}^n=M_{va}\phi+M_{vv}\delta v^n+M_{vp}\delta p+C_b^n\nabla^b \tag{4}$$

$$\delta\dot{p}=M_{pv}\delta v^n+M_{pp}\delta p \tag{5}$$

Where $\phi$ is an misalignment angle of the calculated navigation coordinate system relative to an ideal navigation coordinate system; $\dot{\phi}$ is a first-order derivative of the misalignment angle, $\delta v^n$ is a speed error vector in the navigation coordinate system; $\delta\dot{v}^n$ is a first-order derivative of the speed error vector; $\delta p=[\delta L\ \delta\lambda\ \delta h]^T$ is a position error vector under the local level coordinate system, including a latitude error, a longitude error, and an altitude error in the local level coordinate system; $\delta\dot{p}$ is a first-order derivative of the position error vector; $\varepsilon^b$ is a gyroscope zero drift error vector; $\nabla^b$ is an accelerometer zero drift error vector; the navigation coordinate system is defined as an "east-north-up" geographic coordinate system; and $$C_b^n$$

is a coordinate transformation matrix from the carrier coordinate system to the navigation coordinate system.

In the above formulas 3 to (5):

$$M_1=\begin{bmatrix}0&0&0\\-\omega_{ie}\sin L&0&0\\\omega_{ie}\cos L&0&0\end{bmatrix} \tag{6}$$

$$M_2=\begin{bmatrix}0&0&v_N/(R_M+h)^2\\0&0&-v_E/(R_N+h)^2\\v_E\sec^2L/(R_N+h)&0&-v_E\tan L/(R_N+h)^2\end{bmatrix} \tag{7}$$

$$M_3=\begin{bmatrix}0&0&0\\-2\beta_3h\cos 2L&0&-\beta_3\sin 2L\\-g_e(\beta-4\beta_1\cos 2L)\sin 2L&0&\beta_2\end{bmatrix} \tag{8}$$

$$M_4=\begin{bmatrix}0&-1/(R_M+h)&0\\1/(R_N+h)&0&0\\\tan L/(R_N+h)&0&0\end{bmatrix} \tag{9}$$

$$M_{aa}=-[(\omega_{ie}^n\times)+(\omega_{en}^n\times)] \tag{10}$$

$$M_{ap}=M_1+M_2 \tag{11}$$

$$M_{va}=(f_{sf}^n\times) \tag{12}$$

$$M_{vv}=(v^n\times)M_4-[2(\omega_{ie}^n\times)+(\omega_{en}^n\times)] \tag{13}$$

$$M_{vp}=(v^n\times)(2M_1+M_2)+M_3 \tag{14}$$

$$M_{pv}=\begin{bmatrix}0&1/(R_M+h)&0\\\sec L/(R_N+h)&0&0\\0&0&1\end{bmatrix} \tag{15}$$

$$M_{pp}=\begin{bmatrix}0&0&-v_N/(R_M+h)^2\\v_E\sec L\tan L/(R_N+h)&0&-v_E\sec L/(R_N+h)^2\\0&0&0\end{bmatrix} \tag{16}$$

$$(\omega_{ie}^n\times)=\begin{bmatrix}0&-\omega_{ie}\sin L&\omega_{ie}\cos L\\\omega_{ie}\sin L&0&0\\-\omega_{ie}\cos L&0&0\end{bmatrix} \tag{17}$$

$$(\omega_{en}^n\times)=\begin{bmatrix}0&-v_E\tan L/(R_N+h)&v_E/(R_N+h)\\v_E\tan L/(R_N+h)&0&v_N/(R_M+h)\\-v_E/(R_N+h)&-v_N/(R_M+h)&0\end{bmatrix} \tag{18}$$

$$\beta=\frac{g_p-g_e}{g_e} \tag{19}$$

$$\beta_1=\frac{1}{8}(2\beta f+f^2) \tag{20}$$

$$(f_{sf}^n\times)=\begin{bmatrix}0&-f_{sfz}^n&f_{sfy}^n\\f_{sfz}^n&0&-f_{sfx}^n\\-f_{sfy}^n&f_{sfx}^n&0\end{bmatrix} \tag{21}$$

$$f_{sf}^n=C_b^nf_{sf}^b \tag{22}$$

$$(v^n\times)=\begin{bmatrix}0&-v_U&v_N\\v_U&0&-v_E\\-v_N&v_E&0\end{bmatrix} \tag{23}$$

where $v^n=[v_E\ v_N\ v_U]^T$ represents the east speed, north speed and up speed, in the navigation coordinate system, of the positioning device solved at the previous moment at which positioning has been performed, and $p=[L\ \lambda\ h]$ represents the latitude, longitude and altitude, in the local level coordinate system, of the positioning device solved at the previous moment at which positioning has been performed; $\omega_{ie}$ is the Earth's rotation rate; $R_M$ is a principal radius of curvature of the meridian; $R_N$ is the principal radius of curvature of the prime vertical circle; $g_e$ is an equatorial gravity; $g_p$ is a polar gravity; $R_e$ is the equatorial radius; f is usually 1/298.257223563; $\beta_2$ is usually $3.08\times10^{-6}$ $s^{-2}$; $\beta_3$ is usually $8.08\times10^{-9}$ $s^{-2}$; and $$f_{sf}^{n} = \left(f_{sfx}^{n}, f_{sfy}^{n}, f_{sfz}^{n}\right)^{T}$$

and $$f_{sf}^{b} = \left(f_{sfx}^{b}, f_{sfy}^{b}, f_{sfz}^{b}\right)^{T}$$

are measured values of the accelerometer in the IMU at the previous moment.

The 5G and IMU error state equations are used to model the error evolution of the IMU between the mechanization value and the actual value. The input value is an estimated value, namely a state error estimated value, output by an Error State Kalman Filter (ESKF) at the previous moment. The output value is a state error predicted value of a next moment. The output value acts on [δL δλ δh] in the error observation equation, and the 5G and IMU error state equations are used to predict a state error of the next moment.

In Step S1106, a 5G and IMU error observation equation at the moment to be positioned is constructed according to the second 5G output value and the third 5G output value at the moment to be positioned.

In this step, the positioning device may construct the 5G and IMU error observation equation at the current moment to be positioned, as shown in formula (24) below.

$$\delta z^{l} = \begin{bmatrix} r_I^l - r_B^l \\ \theta_I^l - \theta_B^l \\ \varphi_i^l - \varphi_B^l \end{bmatrix} = \begin{bmatrix} G \\ M \\ W \end{bmatrix} C_e^l T \begin{bmatrix} \delta L \\ \delta\lambda \\ \delta h \end{bmatrix} + w_B \tag{24}$$

In the above formula (24):

$$G = \begin{bmatrix} \frac{x_I^l}{D} & \frac{y_I^l}{D} & \frac{z_I^l}{D} \end{bmatrix} \tag{25}$$

$$D = \sqrt{\left(x_I^l\right)^2 + \left(y_I^l\right)^2 + \left(z_I^l\right)^2} \tag{26}$$

$$M = \begin{bmatrix} \frac{-y_I^l}{\left(x_I^1\right)^2 + \left(y_I^l\right)^2} & \frac{x_I^l}{\left(x_I^1\right)^2 + \left(y_I^l\right)^2} & 0 \end{bmatrix} \tag{27}$$

$$W = \begin{bmatrix} \frac{-z_I^l x_I^l}{D^2\sqrt{\left(x_I^1\right)^2 + \left(y_I^l\right)^2}} & \frac{-z_I^l y_I^l}{D^2\sqrt{\left(x_I^1\right)^2 + \left(y_I^l\right)^2}} & \frac{\sqrt{\left(x_I^1\right)^2 + \left(y_I^l\right)^2}}{D^2} \end{bmatrix} \tag{28}$$

$$T = \begin{bmatrix} -(R_N + h)\sin(L)\cos(\lambda) & -(R_N + h)\cos(L)\sin(\lambda) & \cos(L)\cos(\lambda) \\ -(R_N + h)\sin(L)\sin(\lambda) & (R_N + h)\cos(L)\cos(\lambda) & \cos(L)\sin(\lambda) \\ \left[R_N\left(1 - e^2\right) + h\right]\cos(L) & 0 & \cos(L) \end{bmatrix} \tag{29}$$

where $$\left(x_I^l, y_I^l, z_I^l\right)$$

is a coordinate value of the positioning device provided with the IMU in a local cartesian coordinate system of the 5G base station; we is an observed noise vector of the 5G base station;

$$C_e^l$$

is a coordinate transformation matrix from the local level coordinate system to the local coordinate system of the 5G base station, $e=\sqrt{2f-f^2}$.

In Step S1108, the 5G and IMU error state equation and the 5G and IMU error observation equation are combined, and iterative estimating the positioning information of the positioning device by using an ESKF method, as to determine the positioning information of the positioning device.

In this step, the positioning device combines the formulas (3)-(5) with the formula (24) and uses the error observation equations and the ESKF to correct the state error predicted value output from the error state equations, as to obtain the final state error estimated value. The input value includes a 5G observation value and an IMU mechanization value, and the output value includes the state error estimated value. The IMU mechanization value minus the state error estimated value is the final state estimated value (namely, position, speed and pose) of the positioning device. By using the error state equations in formulas (3)-(5), the error observation equations in formula (24), and the ESKF, a state error may be estimated recursively. The iterative estimation of the position, speed and pose of the positioning device at the current moment may be performed, as to determine the positioning information of the positioning device at the current moment to be positioned. The positioning information may include the position, speed and pose of the positioning device.

The 5G and IMU tightly coupled positioning method involved in step S406 has been described in detail above. The following will continue to describe the satellite navigation system and IMU tightly coupled positioning method involved in step S408 in detail. Many details described in the following satellite navigation system and IMU tightly coupled positioning method are similar to the above 5G and IMU tightly coupled positioning method. For example, the above time alignment method for the 5G base station and the IMU may be used in the same way in the time alignment method for the satellite navigation system and the IMU. For similar implementation details and beneficial effects, refer to the above description of the 5G and IMU tightly coupled positioning method.

In one embodiment, as shown in FIG. 6, the moment to be positioned in step S402 is the IMU sampling moment of the IMU mounted on the positioning device. The second measurement signal in step S408 may include a first satellite output value and a satellite position of the navigation satellite. Step S408, in which when a second measurement signal from a navigation satellite is received within a second predetermined time period which includes the moment to be positioned, positioning information of the positioning device is determined according to the IMU output value and the second measurement signal, may include:

In Step S606, when the second measurement signal from the navigation satellite is received within the second predetermined time period which includes the moment to be positioned, the second measurement signal includes the first satellite output value and the satellite position of the navigation satellite, and a second satellite output value of the navigation satellite at the moment to be positioned is estimated according to the first satellite output value; and In Step S608, a third satellite output value of the IMU at the moment to be positioned is calculated according to the IMU output value and the satellite position, and the positioning information of the positioning device is determined in conjunction with the second satellite output value and the third satellite output value.

In this embodiment, the moment to be positioned is set to belong to the IMU sampling moment. According to the IMU sampling moment, the second satellite output value of the navigation satellite at the moment to be positioned is estimated, and the third satellite output value of the IMU at the moment to be positioned is calculated according to the IMU output value and the satellite position, so that it can be possible to conveniently and quickly determine the third satellite output value of the IMU and the second satellite output value of the navigation satellite, wherein the third satellite output value of the IMU and the second satellite output value of the navigation satellite are at the same moment to be positioned and have the same form, as to facilitate subsequent positioning calculation based on data of the IMU and the navigation satellite.

The first satellite output value, the second satellite output value, and the third satellite output value in above step S606 and step S608 refer to data of which the form is the same to the data which is output by the navigation satellite and used for positioning. In one embodiment, each of the first satellite output value, the second satellite output value and the third satellite output value includes a pseudo-range and a pseudo-range rate.

In one embodiment, the first satellite output value includes: X first satellite output values of the positioning device observed by the navigation satellite at X satellite sampling moments of the navigation satellite within the second predetermined time period, and X is a positive integer.

The value of X may be determined according to an actual need. In this embodiment of the present disclosure, X may be greater than or equal to 2. For example, X may be 3. In other embodiments, X may be a larger or smaller value.

According to different values of X, different methods may be used to estimate the second satellite output value of the navigation satellite at the moment to be positioned. The examples of different estimation methods used when X takes different values, refer to the above example of estimating the second 5G output value of the 5G base station at the moment to be positioned when M takes different values, which will not be described in detail here.

In one embodiment, a time alignment method between the satellite and the IMU involved in step S606, that is, the step that the second satellite output value of the navigation satellite at the moment to be positioned is estimated according to the first satellite output value, may include: by using an interpolation method, the second satellite output value of the navigation satellite at the moment to be positioned is estimated according to the X satellite sampling moments, the X first satellite output values and the moment to be positioned.

In this embodiment, for the example and beneficial effects of using the interpolation method to estimate the second satellite output value of the navigation satellite at the moment to be positioned, refer to the above example and beneficial effects of using the interpolation method to estimate the second 5G output value of the 5G base station at the moment to be positioned, which will not be described in detail here.

In another embodiment, step S606, in which the second satellite output value of the navigation satellite at the moment to be positioned is estimated according to the first satellite output value, includes:

at each of the moments to be positioned within a first time period after the positioning device is turned on, by using an interpolation method, the second satellite output value of the navigation satellite at the moment to be positioned is estimated according to the X satellite sampling moments, the X first satellite output values and the moment to be positioned;

in the first time period, a neural network model is trained according to a training set comprised by Y satellite sampling moments and Y first satellite output values at the Y satellite sampling moments within the first time period, Y≥2, and a second time period is started when the training is completed and a trained neural network model is obtained; and at each of the moments to be positioned within the second time period, the moment to be positioned is input to the trained neural network model and an output value of the neural network model is taken as the estimated second satellite output value of the navigation satellite at the moment to be positioned.

In this embodiment, for the example and beneficial effects of using the interpolation method in combination with the neural network model to estimate the second satellite output value of the navigation satellite at the moment to be positioned, refer to the above example and beneficial effects of using the interpolation method in combination with the neural network model to estimate the second 5G output value of the 5G base station at the moment to be positioned in the above step S902 to step S906, which will not be described in detail here.

In one embodiment, the above step that a neural network is trained according to the training set includes:

adjustable parameters of the neural network model are initialized, the adjustable parameters including a weight and a bias value of the neural network model;

a state space model for the adjustable parameters of the neural network model is established;

by using a UKF algorithm, recursive estimation is performed on the adjustable parameters according to the state space model and the training set, until an output error of the neural network model reaches a predetermined error range, as to determine trained adjustable parameters; and the trained neural network model is generated according to the trained adjustable parameters.

For the examples and beneficial effects of training the neural network model in this embodiment, refer to the examples and beneficial effects of training the neural network model in steps S1002-S1008 of the 5G and IMU tightly coupled positioning method described above, which will not be described in detail here.

In the above satellite navigation system and IMU tightly coupled positioning method of the present disclosure, the implementation details such as the calculation formulas in step S608 may be achieved by using a combined positioning method which combines any existing satellite navigation system and IMU. For example, the implementation details may be achieved by using the combined positioning method which combines the IMU and the satellite navigation system disclosed in references [1] Titerton D H, Weston J L.

Strapdown industrial navigation technology [M]. 2004. and [2] Nouraldin A, Karamat T B, George J. Fundamentals of Industrial Navigation, Satellite based Positioning and Their Integration [M]. 2013. Disclosed contents of these references are incorporated by its reference.

In the positioning method of the present disclosure, when a first measurement signal from a 5G base station is received within a first predetermined time period which includes a moment to be positioned, and a second measurement signal from a navigation satellite is also received within a second predetermined time period which includes the moment to be positioned, the positioning device may selectively perform one of steps S406 and S408. Thus, one of the two positioning methods may be used to position the positioning device, wherein the two positioning methods include the 5G and IMU tightly coupled positioning method and the satellite navigation system and IMU tightly coupled positioning method. Or, the positioning device may also combine the 5G and IMU tightly coupled positioning method and the satellite navigation system and IMU tightly coupled positioning method to position the positioning device.

In one embodiment, the positioning method of the present disclosure may further include:

when the first measurement signal from the 5G base station is received within the first predetermined time period which includes the moment to be positioned, and a second measurement signal from a navigation satellite is also received within a second predetermined time period which includes a moment to be positioned, positioning information of the positioning device is determined according to the IMU output value and the first measurement signal; and final positioning information of the positioning device is determined according to the positioning information and the second measurement signal.

Further, in one embodiment, the first measurement signal includes a first 5G output value and a base station position of the 5G base station, and the second measurement signal includes a first satellite output value and a satellite position of the navigation satellite. The above positioning method may include:

when the first measurement signal from the 5G base station is received within the first predetermined time period which includes the moment to be positioned, and a second measurement signal from a navigation satellite is also received within a second predetermined time period which includes a moment to be positioned, a second 5G output value of the 5G base station at the moment to be positioned is estimated according to the first 5G output value; a third 5G output value of the IMU at the moment to be positioned is calculated according to the IMU output value and the base station location, and the positioning information of the positioning device is determined in conjunction with the second 5G output value and the third 5G output value; the second satellite output value of the navigation satellite at the moment to be positioned is estimated according to the first satellite output value; a fourth satellite output value of a 5G and IMU tight coupling subsystem at the moment to be positioned is calculated according to the determined positioning information and satellite position; and the final positioning information of the positioning device is determined in conjunction with the second satellite output value and the fourth satellite output value.

Alternatively, in another embodiment, the positioning method of the present disclosure may also include:

when the first measurement signal from the 5G base station is received within the first predetermined time period which includes the moment to be positioned, and a second measurement signal from a navigation satellite is also received within a second predetermined time period which includes a moment to be positioned, positioning information of the positioning device is determined according to the IMU output value and the second measurement signal; and final positioning information of the positioning device is determined according to the positioning information and the first measurement signal.

Further, in one embodiment, the first measurement signal includes a first 5G output value and a base station position of the 5G base station, and the second measurement signal includes a first satellite output value and a satellite position of the navigation satellite. The above positioning method may include:

when the first measurement signal from the 5G base station is received within the first predetermined time period around the moment, and a second measurement signal from a navigation satellite is also received within a second predetermined time period which includes a moment to be positioned, a second satellite output value of the navigation satellite at the moment to be positioned is estimated according to the first satellite output value; a third satellite output value of the IMU at the moment to be positioned is calculated according to the IMU output value and the navigation satellite, and the positioning information of the positioning device is determined in conjunction with the second satellite output value and the third satellite output value; the second 5G output value of the 5G base station at the moment to be positioned is estimated according to the first 5G output value; a fourth 5G output value of a satellite navigation system and IMU tight coupling subsystem at the moment to be positioned is calculated according to the determined positioning information and base station position; and the positioning information of the positioning device is determined in conjunction with the second 5G output value and the fourth 5G output value.

The technical solutions of the above two embodiments combine the 5G and IMU tightly coupled positioning method with the satellite navigation system and IMU tightly coupled positioning method to position the positioning device. For details such as the corresponding calculation formulas and beneficial effects, refer to the above relevant descriptions of the 5G and IMU tightly coupled positioning method and the satellite navigation system and IMU tightly coupled positioning method, which will not be described in detail here.

In the above two embodiments, when the first measurement signal from the 5G base station is received within the first predetermined time period which includes the moment to be positioned, and a second measurement signal from a navigation satellite is also received within a second predetermined time period which includes a moment to be positioned, the positioning device is positioned by combining the 5G and IMU tightly coupled positioning method combined with the satellite navigation system and IMU tightly coupled positioning method, thereby further improving the positioning accuracy.

It should be understood that although the steps in the flow charts of FIG. 4, FIG. 6 and FIG. 9 to FIG. 11 are shown sequentially as indicated by the arrows, the steps are not necessarily performed sequentially as indicated by the arrows. Unless specifically stated otherwise herein, the steps are not performed in a strict order of limitation, and the steps may be performed in other orders. Moreover, at least part of the steps in FIG. 4, FIG. 6 and FIG. 9 to FIG. 11 may include a plurality of substeps or phases that are not necessarily performed at the same time, but may be performed at different times. These substeps or phases are not necessarily performed in sequence, but rather may be performed in turn or alternation with other steps or other substeps or at least part of the substeps or phases in the other steps.

Figure 12:
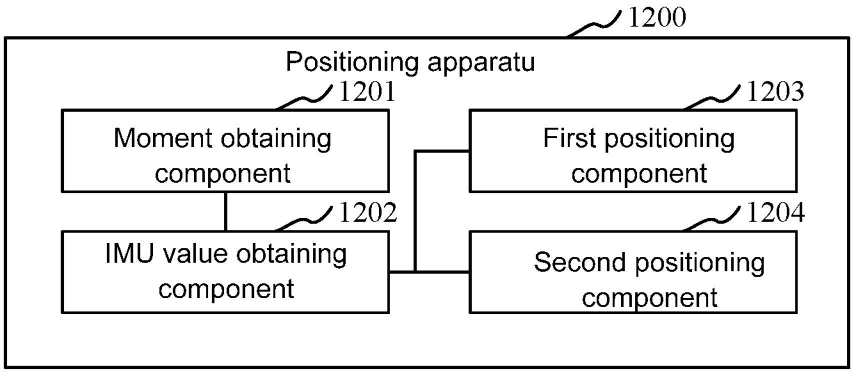
FIG. 12 is a schematic block diagram of a positioning apparatus in one embodiment of the present disclosure.

In one embodiment, referring to FIG. 12, a positioning apparatus 1200 is further provided, including a moment obtaining component 1201, an IMU value obtaining component 1202, a first positioning component 1203, and a second positioning component 1204.

The moment obtaining component 1201 is configured to obtain a moment to be positioned at which positioning is to be performed.

The IMU value obtaining component 1202 is configured to obtain an IMU output value of an IMU at the moment to be positioned.

The first positioning component 1203 is configured to: when a first measurement signal from a 5G base station is received within a first predetermined time period which includes the moment to be positioned, determine positioning information of the positioning device according to the IMU output value and the first measurement signal.

The second positioning component 1204 is configured to: when a second measurement signal from a navigation satellite is received within a second predetermined time period which includes the moment to be positioned, determine positioning information of the positioning device according to the IMU output value and the second measurement signal.

According to the above positioning apparatus of this embodiment, by combining 5G and IMU tightly coupled positioning with satellite navigation system and IMU tightly coupled positioning, when the first measurement signal from the 5G base station is received within the first predetermined time period which includes the moment to be positioned, the first measurement signal and the IMU output value are combined to determine the positioning information of the positioning device; and at the same time, when the second measurement signal from the navigation satellite is received within in the second predetermined time period which includes the moment to be positioned, the second measurement signal and the IMU output value are combined to determine the positioning information of the positioning device. Since 5G positioning and satellite positioning are highly complementary in indoor and outdoor environments, the positioning method for deeply fusing the satellite navigation system, the 5G base station and the IMU in the present disclosure can effectively improve the continuity and effectiveness of positioning in time and space.

Figure 13:
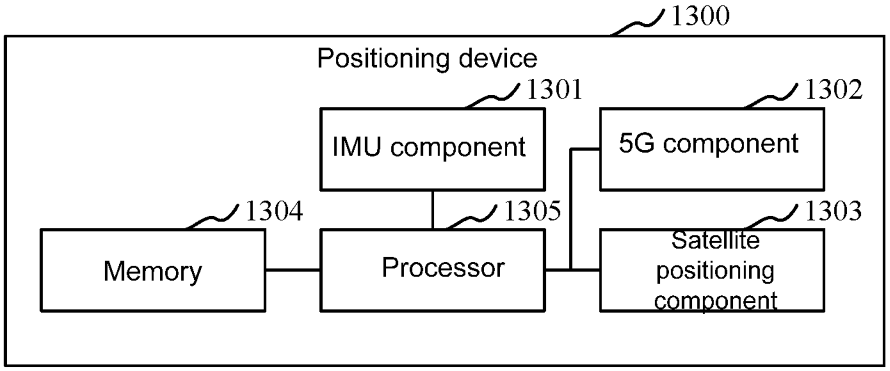
FIG. 13 is a schematic structural diagram of a positioning device in one embodiment of the present disclosure.

In one embodiment, referring to FIG. 13, a positioning device 1300 is further provided, including an IMU component 1301, a 5G component 1302, a satellite positioning component 1303, a memory 1304 and a processor 1305. The IMU component 1301, the 5G component 1302, the satellite positioning component 1303 and the memory 1304 are respectively connected to the processor 1305.

The IMU component 1301 is configured to obtain an IMU output value of the positioning device at an IMU sampling moment, and outputs the IMU output value to the processor 1305.

The 5G component 1302 is configured to receive, from a 5G base station, a first measurement signal of an uplink reference signal of the positioning device, wherein the uplink reference signal of the positioning device is measured by the 5G base station at a 5G sampling moment, and output the first measurement signal to the processor 1305.

The satellite positioning component 1303 is configured to receive, from a navigation satellite, a second measurement signal of the positioning device observed by the navigation satellite at a satellite sampling moment, and output the second measurement signal to the processor 1305.

The memory 1304 is configured to store a computer program; and

- the processor 1305 is configured to implement, when executing the computer program, the following method:
- obtaining a moment to be positioned at which positioning is to be performed, wherein the moment is an IMU sampling moment of an IMU mounted on a positioning device;
- obtaining an IMU output value of an IMU at the moment to be positioned
- when a first measurement signal from a 5G base station is received within a first predetermined time period which includes the moment to be positioned, determining positioning information of the positioning device according to the IMU output value and the first measurement signal; and
- when a second measurement signal from a navigation satellite is received within a second predetermined time period which includes the moment to be positioned, determining positioning information of the positioning device according to the IMU output value and the second measurement signal.

In other embodiments, the processor 1305 in the above positioning device 1300 further implements the positioning method of any one of the above embodiments when executing the computer program.

In one embodiment, the positioning device 1300 may be any one of a mobile phone, a tablet computer, a portable wearable device, a vehicle and a ship. In other embodiments, the positioning device 1300 may also be a component that is mounted on a mobile phone, a tablet computer, a portable wearable device, a vehicle, or a ship.

Figure 14:
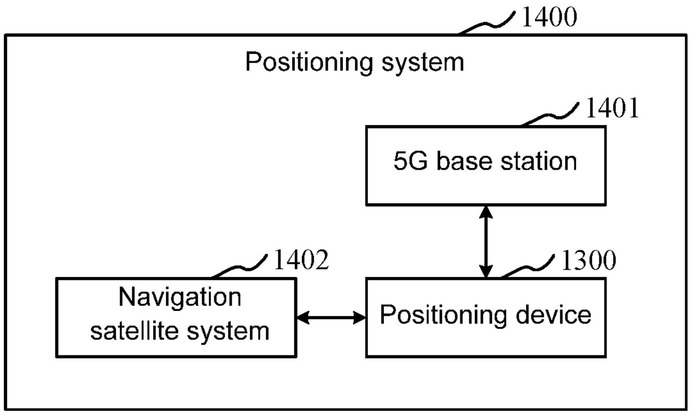
FIG. 14 is a schematic structural diagram of a positioning system in one embodiment of the present disclosure.

In one embodiment, referring to FIG. 14, a positioning system 1400 is further provided, including a 5G base station 1401, a navigation satellite 1402 and a positioning device 1300. The positioning device 1300 is in communication connection with the 5G base station 1401 and the navigation satellite 1402 respectively, The 5G base station 1401 is configured to measure a first measurement signal of an uplink reference signal of the positioning device at a 5G sampling moment, and output the first measurement signal to the positioning device.

The navigation satellite 1402 is configured to observe a second measurement signal of the positioning device at a satellite sampling moment, and output the second measurement signal to the positioning device.

The positioning device 1300 is configured to perform the following method:

- obtaining a moment to be positioned at which positioning is to be performed;
- obtaining an IMU output value of an IMU at the moment to be positioned;
- when a first measurement signal from a 5G base station is received within a first predetermined time period which includes the moment to be positioned, determining positioning information of the positioning device according to the IMU output value and the first measurement signal; and when a second measurement signal from a navigation satellite is received within a second predetermined time period which includes the moment to be positioned, determining positioning information of the positioning device according to the IMU output value and the second measurement signal.

In other embodiments, the above positioning device 1300 also implements the positioning method of any one of the above embodiments.

In one embodiment, a computer-readable storage medium is further provided, which stores a computer program. The computer program, when executed by a processor, implements the following method:

obtaining a moment to be positioned at which positioning is to be performed;

obtaining an IMU output value of an IMU at the moment to be positioned;

when a first measurement signal from a 5G base station is received within a first predetermined time period which includes the moment to be positioned, determining positioning information of the positioning device according to the IMU output value and the first measurement signal; and when a second measurement signal from a navigation satellite is received within a second predetermined time period which includes the moment to be positioned, determining positioning information of the positioning device according to the IMU output value and the second measurement signal.

In other embodiments, when executed by a processor, the above computer program further implements the positioning method of any one of the above embodiments.

The technical features of the embodiments described above can be arbitrarily combined. In order to make the description concise, all possible combinations of various technical features in the above embodiments are not completely described. However, the combinations of these technical features should be considered as the scope described in the present specification as long as there is no contradiction in them.

The foregoing embodiments represent only a few implementation modes of the present disclosure, and the descriptions are specific and detailed, but should not be construed as limiting the patent scope of the present disclosure. It should be noted that those of ordinary skill in the art may further make variations and improvements without departing from the conception of present disclosure, and these variations and improvements all fall within the protection scope of present disclosure. Therefore, the patent protection scope of present disclosure should be subject to the appended claims.

What is claimed is:

1. A positioning method, comprising:

obtaining a moment to be positioned at which positioning is to be performed;

obtaining an Inertial Measurement Unit (IMU) output value of an IMU at the moment to be positioned;

when a first measurement signal from a 5G base station is received within a first predetermined time period which comprises the moment to be positioned, determining positioning information of a positioning device according to the IMU output value and the first measurement signal; and when a second measurement signal from a navigation satellite is received within a second predetermined time period which comprises the moment to be positioned, determining positioning information of a positioning device according to the IMU output value and the second measurement signal;

wherein the moment to be positioned is an IMU sampling moment of the IMU mounted on the positioning device; the first measurement signal comprises a first 5G output value and a base station position of the 5G base station; determining the positioning information of the positioning device according to the IMU output value and the first measurement signal comprises: estimating a second 5G output value of the 5G base station at the moment to be positioned according to the first 5G output value, calculating a third 5G output value of the IMU at the moment to be positioned according to the IMU output value and the base station position, and determining the positioning information of the positioning device in conjunction with the second 5G output value and the third 5G output value.

2. The positioning method according to claim 1, wherein each of the first 5G output value, the second 5G output value and the third 5G output value comprises an angle of arrival and time of arrival.

3. The positioning method according to claim 1, wherein the first 5G output value comprises: M first 5G output values of uplink reference signals of the positioning device, wherein the uplink reference signals are measured by the 5G base station at M 5G sampling moments of the 5G base station within the first predetermined time period, M≥2.

4. The positioning method according to claim 3, wherein estimating the second 5G output value of the 5G base station at the moment to be positioned according to the first 5G output value comprises:

estimating, by using an interpolation method, the second 5G output value of the 5G base station at the moment to be positioned according to the M 5G sampling moments, the M first 5G output values and the moment to be positioned.

5. The positioning method according to claim 3, wherein estimating the second 5G output value of the 5G base station at the moment to be positioned according to the first 5G output value comprises:

at each of moments within a first time period after the positioning device is turned on, estimating, by using an interpolation method, the second 5G output value of the 5G base station at the moment to be positioned according to the M 5G sampling moments, the M first 5G output values and the moment to be positioned;

training in the first time period, a neural network model according to a training set comprised by N 5G sampling moments within the first time period and N first 5G output values at the N 5G sampling moments, N≥2, and entering a second time period when training is completed and a trained neural network model is obtained; and inputting the moment to be positioned to the trained neural network model at each of the moments to be positioned within the second time period, and taking an output value of the neural network model as the estimated second 5G output value of the 5G base station at the moment to be positioned.

6. The positioning method according to claim 5, wherein training the neural network model according to the training set comprises:

initializing adjustable parameters of a neural network model, the adjustable parameters comprising a weight and a bias value of the neural network model;

establishing a state space model for the adjustable parameters of the neural network model;

performing, according to the state space model and the training set, recursive estimation on the adjustable parameters by using a Unscented Kalman Filter (UKF) algorithm, until an output error of the neural network model reaches a predetermined error range, to determine trained adjustable parameters; and generating the trained neural network model according to the trained adjustable parameters.

7. The positioning method according to claim 1, wherein calculating the third 5G output value of the IMU at the moment to be positioned according to the IMU output value and the base station position, and determining the positioning information of the positioning device in conjunction with the second 5G output value and the third 5G output value comprises:

calculating the third 5G output value of the IMU at the moment to be positioned according to the IMU output value and the base station position;

constructing a 5G and IMU error state equation at the moment to be positioned according to positioning information of the positioning device obtained at a previous moment at which positioning has been performed, and the IMU output value at the previous moment;

constructing a 5G and IMU error observation equation at the moment to be positioned according to the second 5G output value and the third 5G output value at the moment to be positioned; and combining the 5G and IMU error state equation and the 5G and IMU error observation equation, and performing iterative estimation on the positioning information of the positioning device by using an Error State Kalman Filter (ESKF) method, to determine the positioning information of the positioning device.

8. The positioning method according to claim 1, wherein the moment to be positioned is an IMU sampling moment of the IMU mounted on the positioning device; the second measurement signal comprises a first satellite output value and a satellite position of the navigation satellite; determining the positioning information of the positioning device according to the IMU output value and the second measurement signal comprises:

estimating a second satellite output value of the navigation satellite at the moment to be positioned according to the first satellite output value, calculating a third satellite output value of the IMU at the moment to be positioned according to the IMU output value and the satellite position, and determining the positioning information of the positioning device in conjunction with the second satellite output value and the third satellite output value.

9. The positioning method according to claim 8, wherein each of the first satellite output value, the second satellite output value and the third satellite output value comprises a pseudo-range and a pseudo-range rate.

10. The positioning method according to claim 8, wherein the first satellite output value comprises: X first satellite output values of the positioning device observed by the navigation satellite at X satellite sampling moments of the navigation satellite within the second predetermined time period, X≥2.

11. The positioning method according to claim 10, wherein estimating the second satellite output value of the navigation satellite at the moment to be positioned according to the first satellite output value comprises:

estimating, by using an interpolation method, the second satellite output value of the navigation satellite at the moment to be positioned according to the X satellite sampling moments, the X first satellite output values and the moment to be positioned.

12. The positioning method according to claim 10, wherein estimating the second satellite output value of the navigation satellite at the moment to be positioned according to the first satellite output value comprises:

at each of the moments to be positioned within a first time period after the positioning device is turned on, estimating, by using an interpolation method, the second satellite output value of the navigation satellite at the moment to be positioned according to the X satellite sampling moments, the X first satellite output values and the moment to be positioned;

training in the first time period, a neural network model according to a training set comprised by Y satellite sampling moments to be positioned within the first time period and Y first satellite output values at the Y satellite sampling moments, Y≥2, and entering a second time period when training is completed and a trained neural network model is obtained; and inputting the moment to be positioned to the trained neural network model at each of the moments to be positioned within the second time period, and taking an output value of the neural network model as the estimated second satellite output value of the navigation satellite at the moment to be positioned.

13. The positioning method according to claim 12, wherein training the neural network model according to the training set comprises:

initializing adjustable parameters of a neural network model, the adjustable parameters comprising a weight and a bias value of the neural network model;

establishing a state space model for the adjustable parameters of the neural network model;

performing, according to the state space model and the training set, recursive estimation on the adjustable parameters by using a Unscented Kalman Filter (UKF) algorithm, until an output error of the neural network model reaches a predetermined error range, to determine trained adjustable parameters; and generating the trained neural network model according to the trained adjustable parameters.

14. The positioning method of claim 1, wherein the IMU output value comprises: a position, speed, and pose of the positioning device.

15. The positioning method of claim 1, wherein the positioning device is any one of a mobile phone, a tablet computer, a portable wearable device, a vehicle and a ship.

16. A positioning device, comprising an Inertial Measurement Unit (IMU) component, a 5G component, a satellite positioning component, a memory and a processor, wherein the IMU component, the 5G component, the satellite positioning component and the memory are respectively connected to the processor;

the IMU component is configured to obtain an IMU output value of a positioning device at an IMU sampling moment, and output the IMU output value to the processor;

the 5G component is configured to receive from a 5G base station, a first measurement signal of an uplink reference signal of the positioning device, wherein the uplink reference signal of the positioning device is measured by the 5G base station at a 5G sampling moment, and output the first measurement signal to the processor;

the satellite positioning component is configured to receive from a navigation satellite, a second measurement signal of the positioning device observed by the navigation satellite at a satellite sampling moment, and output the second measurement signal to the processor;

the memory stores a computer program; and the processor, when executing the computer program, implements following actions:

obtaining a moment to be positioned at which positioning is to be performed;

obtaining the Inertial Measurement Unit (IMU) output value of an IMU at the moment to be positioned;

determining positioning information of a positioning device according to the IMU output value and the first measurement signal; and determining positioning information of a positioning device according to the IMU output value and the second measurement signal;

wherein the moment to be positioned is an IMU sampling moment of the IMU mounted on the positioning device; the first measurement signal comprises a first 5G output value and a base station position of the 5G base station; determining the positioning information of the positioning device according to the IMU output value and the first measurement signal comprises: estimating a second 5G output value of the 5G base station at the moment to be positioned according to the first 5G output value, calculating a third 5G output value of the IMU at the moment to be positioned according to the IMU output value and the base station position, and determining the positioning information of the positioning device in conjunction with the second 5G output value and the third 5G output value.

17. The positioning device according to claim 16, wherein the positioning device is any one of a mobile phone, a tablet computer, a portable wearable device, a vehicle and a ship.

18. A positioning system, comprising a 5G base station, a navigation satellite and a positioning device, wherein the positioning device is in communication connection with the navigation satellite and the 5G base station;

the 5G base station is configured to measure a first measurement signal of an uplink reference signal of the positioning device at a 5G sampling moment, and output the first measurement signal to the positioning device;

the navigation satellite is configured to observe a second measurement signal of the positioning device at a satellite sampling moment, and output the second measurement signal to the positioning device; and the positioning device is configured to perform following actions:

obtaining a moment to be positioned at which positioning is to be performed;

obtaining an Inertial Measurement Unit (IMU) output value of an IMU at the moment to be positioned;

determining positioning information of a positioning device according to the IMU output value and the first measurement signal; and determining positioning information of a positioning device according to the IMU output value and the second measurement signal;

wherein the moment to be positioned is an IMU sampling moment of the IMU mounted on the positioning device; the first measurement signal comprises a first 5G output value and a base station position of the 5G base station; determining the positioning information of the positioning device according to the IMU output value and the first measurement signal comprises: estimating a second 5G output value of the 5G base station at the moment to be positioned according to the first 5G output value, calculating a third 5G output value of the IMU at the moment to be positioned according to the IMU output value and the base station position, and determining the positioning information of the positioning device in conjunction with the second 5G output value and the third 5G output value.

19. The positioning system of claim 17, wherein the positioning device is any one of a mobile phone, a tablet computer, a portable wearable device, a vehicle and a ship.

* * * * *